United States Patent [19]

Doak et al.

[11] Patent Number: 4,720,997

[45] Date of Patent: Jan. 26, 1988

[54] MATERIAL LEVEL MONITOR

[76] Inventors: Roni K. Doak, 15021 Kimberly La., Houston, Tex. 77079; Frank Poag, Rte. 2, Box 104T2, Rosenberg, Tex. 77471

[21] Appl. No.: 936,701

[22] Filed: Dec. 1, 1986

[51] Int. Cl.[4] .............................................. G01F 23/22
[52] U.S. Cl. .................................. 23/295; 73/304 R; 307/310
[58] Field of Search ............... 73/295, 313, 304 R; 340/620, 622

[56] References Cited

U.S. PATENT DOCUMENTS

| | | | |
|---|---|---|---|
| 3,918,035 | 11/1975 | Eshraghian | 73/308 |
| 4,307,606 | 12/1981 | Johnson | 73/295 |
| 4,539,547 | 9/1985 | Nagy et al. | 73/308 X |
| 4,564,834 | 1/1986 | Steele | 73/295 |
| 4,590,797 | 5/1986 | Beaubatie et al. | 73/295 |
| 4,600,844 | 7/1986 | Atkins | 340/620 X |
| 4,628,302 | 12/1986 | Barr et al. | 340/620 |

Primary Examiner—Daniel M. Yasich

[57] ABSTRACT

The electronic monitor includes a level-sensing circuit, a reference circuit, a comparator circuit, and a logic circuit. The level sensing-circuit includes at least one level sensor positioned within the reservoir adjacent to and below a predetermined level. The reference circuit includes a reference sensor positioned in the air adjacent to the maximum allowed level for the material. A current source applies current to all the sensors. The comparator circuit compares the voltage across the reference sensor and the voltage across the level sensor and provides a difference voltage to a logic circuit that activates selective signaling devices depended upon the level of the monitored material. The sensors are preferably negative-coefficient thermistors.

13 Claims, 3 Drawing Figures

MATERIAL LEVEL MONITOR

FIELD OF THE INVENTION

This invention relates in general to a level monitor capable of giving a warning that the level of a material within a reservoir is dangerously low, or that it is at one or more prescribed levels within a predetermined range. The utility of the invention will be illustrated for monitoring the levels of crank case engine oil.

BACKGROUND OF THE INVENTION

Electronic monitors for sensing the level of a varying volume of material within a vertical range defined by predetermined spacings between sensors positioned within a reservoir, such as a crank case, or on a sensing rod or dip stick, are already known, but such known monitors provide unreliable level readings.

SUMMARY OF THE INVENTION

The electronic monitor is adapted for sensing a predetermined level of a varying volume of material within a reservoir. The monitor includes a level-sensing circuit, a reference circuit, a comparator circuit, and a logic circuit. The level sensing-circuit includes at least one level sensor positioned within the reservoir adjacent to and below the predetermined level.

The reference circuit provides temperature compensation when the material undergoes a large temperature change. The reference circuit includes a reference sensor positioned in the air adjacent to the maximum allowed level for the material. A current source applies current to all the sensors thereby heating them until they reach a predetermined temperature when all the sensors are outside of the medium. The sensors are characterized in that the resistance of a heated level sensor when within the material is higher than the resistance of a heated sensor outside of the material. Each current develops a voltage across its sensor. The voltages are substantially identical when all the heated sensors are outside of the medium, and the voltage across a heated level sensor is higher when the sensor is within the material. The comparator circuit includes at least one voltage comparator for comparing the voltage across the reference sensor and the voltage across the level sensor and for providing a difference voltage. The logic circuit includes at least two signaling devices for monitoring the difference voltage. One signaling device becomes activated when the material level is at the predetermined level which corresponds to a difference voltage which activates the circuit containing the one signaling device. The other signaling device becomes activated when the material level is below the predetermined level which corresponds to a difference voltage that activates the circuit containing the other signaling device.

The level monitor of this invention has particular utility for monitoring the oil level within an automobile crank case. The level-sensing circuit utilizes two level-sensing thermistors that are vertically spaced-apart so that both will be immersed when the oil in the crank case is at its highest allowed level. The reference and the two level sensing-thermistors are heated until they reach a predetermined temperature and the voltages thereacross are compared by two voltage comparators forming part of the comparator circuit. Each one of the three thermistors has a negative coefficient. Each voltage comparator produces an output voltage which is monitored by the logic circuit which includes at least three distinct signaling devices. When a sufficient voltage difference is monitored by the comparators, the logic circuit will activate one of the three signaling devices. The activated signaling device indicates whether the oil level in the crank case is normal, insufficient, or dangerously low.

DETAILED DESCRIPTION OF A PREFERRED EMBODIMENT

Figure 1:
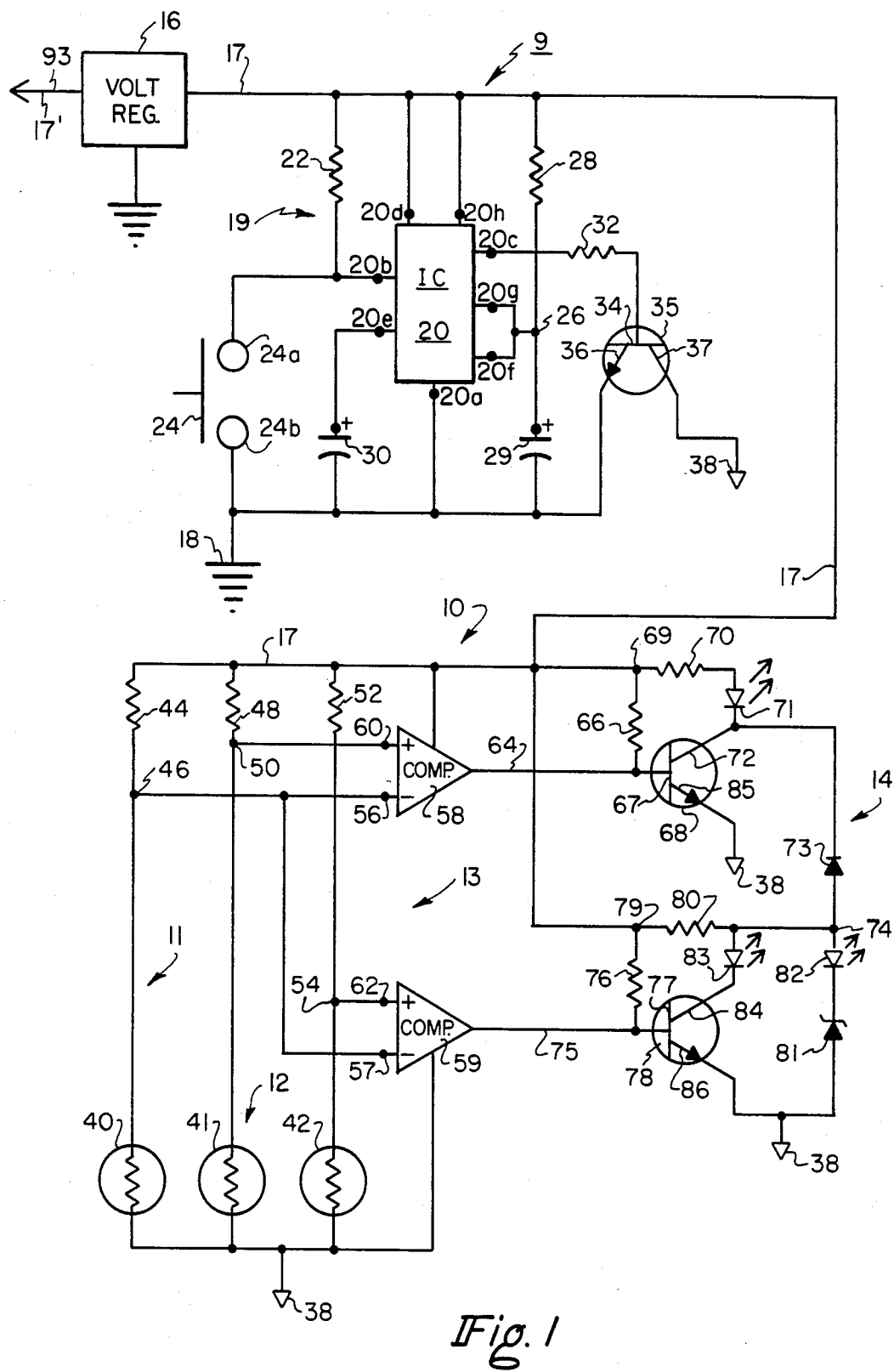
FIG. 1 is circuit diagram of a preferred embodiment of the level monitor of the invention.

In FIG. 1 is shown the preferred monitor, generally designated as 9, which includes a network 10 comprising a reference sensing circuit 11, an oil level sensing circuit 12, a voltage comparator circuit 13, and a logic circuit 14 for energizing the level-indicating devices.

A voltage regulator 16 continuously supplies a regulated DC voltage between a voltage line 17 and ground 18.

A timer circuit 19 includes an IC 20 having pins 20a–20h and is configured for monostable operation to provide a single cycle of operation. Trigger pin 20b is connected to line 17 through a resistor 22 and to ground 18 through a momentary-contact, push-button switch 24 having contacts 24a and 24b.

Pins 20f and 20g are connected to junction 26 of a charging network consisting of a resistor 28 and a capacitor 29. The values selected for resistor 28 and capacitor 29 will determine the length of time during which timer 19 will remain on after switch 24 is released. Reset pin 20d and VCC pin 20h are tied to voltage line 17 to prevent false triggering and to provide power to IC 20. Pin 20a is connected to ground 18. Pin 20e is connected through a capacitor 30 to ground 18 to provide a control voltage.

The voltage from output pin 20c is applied through a resistor 32 to the base 34 of a atransistor 35 whose emitter 36 is connected to ground 18, and whose collector 37 is connected to a common 38 which is switched to ground 18 only when transistor 35 of timer 19 is on.

Network 10 utilizes level-detecting sensors which preferably are negative-coefficient thermistors. Reference circuit 11 has a reference thermistor 40 and a resistor 44 having a junction 46 therebetween. Level circuit 12 includes level-detecting thermistors 41 and 42. Thermistor 41 and resistor 48 form a junction 50, and thermistor 42 and resistor 52 form a junction 54 therebetween.

Junction 46 is connected to the negative input terminal 56 and 57 of voltage comparators 58 and 59, respectively. Junction 50 is connected to positive terminal 60 of comparator 58, and junction 54 is connected to positive terminal 62 of comparator 59. The output line 64 from comparator 58 is connected to a resistor 66 and to the base 67 of a transistor 68. Resistor 66 forms a junction 69 with a resistor 70 that is also connected in series with a green LED 71 to the collector 72 of transistor 68.

A blocking diode 73 is connected between collector 72 and a junction 74.

The output line 75 from comparator 59 is connected to a resistor 76 and to the base 77 of a transistor 78. Resistor 76 forms a junction 79 with a resistor 80 that is also connected to junction 74. A zener diode 81 and a red LED 82 are connected between junction 74 and common 38. A yellow LED 83 is connected between collector 84 of transistor 78 and junction 74. The emitters 85,86 of transistors 68,78 respectively, are connected to common 38.

Figure 2:
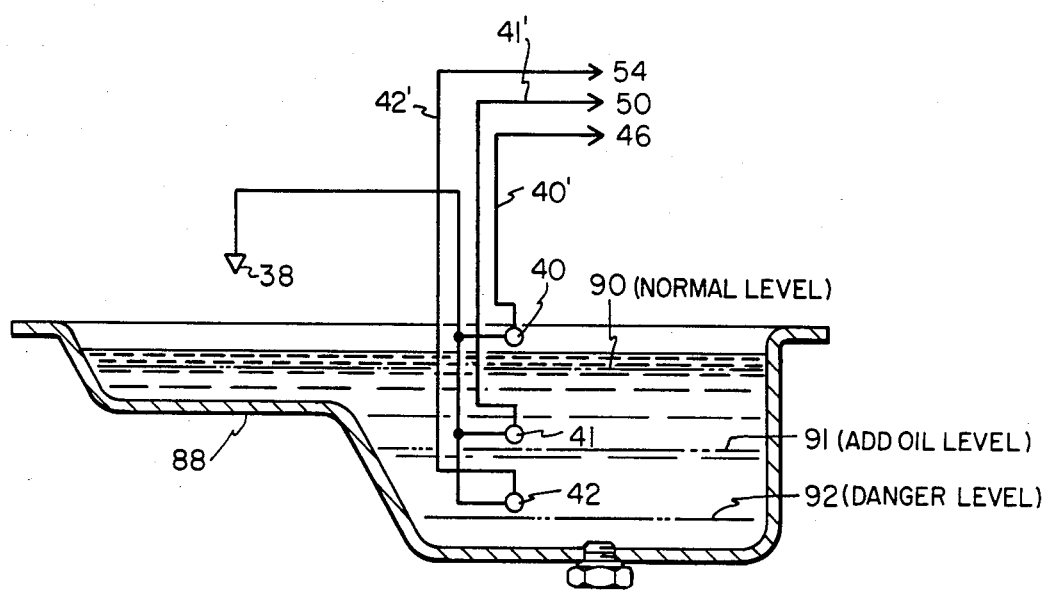
FIG. 2 is a schematic representation of a crank case within which the thermistors of the monitor shown in FIG. 1 are installed.
Figure 3:
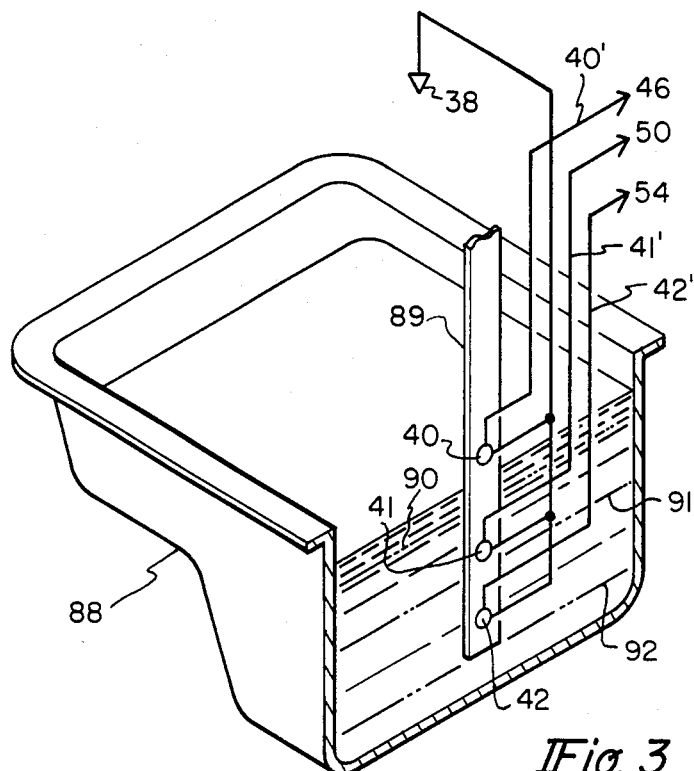
FIG. 3 is a schematic representation of a dip stick on which the thermistors of the monitor shown in FIG. 1 are installed.

The utility of monitor 9 will be illustrated in connection with monitoring the levels of engine oil. For that purpose, thermistors 40-42 are fixedlly mounted within a crank case 88 (FIG. 2) or they can be mounted on a flexible dip stick 89 which is normally removably received within a tubing in crank case 88 (FIG. 3).

Reference thermistor 40 (FIGS. 2-3) is positioned in close proximity to thermistors 41-42, but it should always remain in the air above "normal level" 90, which represents the maximum allowed level within crank case 88. The placement of thermistor 40 provides a reliable method of temperature compensation and prevents possible erroneous readings due to a large temperature operating range for the crnka case oil. Thermistors 41 and 42 are vertically spaced-apart so that both will be immersed in the oil below level 90: thermistor 41 is positioned below thermistor 40 and adjacent to and above the "add-oil" level 91, and thermistor 42 is positioned below thermistor 41 and adjacent to and above the "danger level" 92. One terminal of each thermistor is connected to common 38, and the other terminals of thermistors 40,41,42 are connected through lines 40',41',42' to junctions 46,50,54, respectively, in network 10 (FIG. 1).

Generally speaking, it is the function of monitor 9 to detect whether thermistor 42 or both thermistors 41 and 42 are immersed in oil. To this end, comparators 58 and 59 compare the voltages at junctions 50,54 of thermistors 41,42 respectively, against the reference voltage at junction 46 of thermistor 40.

Dependent upon the amplitude of these monitored voltages logic circuit 14 will turn on one of the three LEDs 71, 82 or 83. The illuminated LED will indicate the actual oil level within crank case 88 relative to levels 91 and 92.

More specifically, thermistor 41 in series with resistor 48 forms a voltage divider whose junction 50 provides to positive input terminal 60 of comparator 58 a voltage that is indicative of the oil level around thermistor 41.

Thermistor 42 in series with resistor 52 forms a voltage divider whose junction 54 provides to positive input terminal 62 of comparator 59 a voltage that is indicative of the oil level around thermistor 42.

DC power for operating network 10 can be derived from an unregulated line 17' connected to the car battery or to an independent power supply (not shown). The unregulated voltage can have a range between 10 to 18 volts at 700 milliamps. The desired unregulated voltage is 12 volts DC.

Voltage regulator 16 continuously supplies a regulated DC voltage having a range up to 9 volts between line 17 and ground 18 at 700 milliamps and at an ambient temperature of approximately 87° F.

Voltage line 17 supplies voltage to network 10 and its circuits 11-14 but only when transistor 35 within timer 19 is turned on and common 38 is switched to ground 18. Then, voltage line 17 becomes connected directly to junctions 69, 79, resistors 44,48 and 52, and comparators 58,59.

The voltage values mentioned hereinafter are empirical values measured within the preferred embodiment.

In operation, when timer 19 is off, resistor 22 applies to trigger pin 20b a positive DC voltage of approximately 9 volts.

When a sample reading is desired, timer 19 is activated by momentarily depressing push-button switch 24 which connects ground 18 to trigger pin 20b which thus starts an energizing cycle whose duration is determined by resistor 28 and capacitor 29.

After switch 24 is momentarily depressed, capacitor 29 is charged through resistor 28 until the voltage thereacross reaches the threshold voltage of pin 20f, which is approximately 5 volts. The output voltage of pin 20c is raised to 7.4 volts and is applied through resistor 32 to base 34 whereupon transistor 35 turns on, and its collector 37 switches common 38 to ground 18 thereby simultaneously energizing circuits 11-14.

Currents flowing through resistors 44, 48 and 52 heat up thermistors 40, 41 and 42, respectively. The resistance of a heated thermistor changes in value depending on the nature of the ambient medium which surrounds it.

The average density of oil is about 1100 grams/liter, whereas the average density of air is only about 1.2 grams/liter. Therefore, a thermistor stays cooler when immersed in oil than in air, and the resistance of a heated negative coefficient thermistor in oil will be higher than when the thermistor is in air.

When the oil in crank case 88 is below danger level 92, the three thermistors 40-42 are surrounded by air. Each thermistor reaches approximately the same temperature of approximately 200° F., which is selected to allow for the expected wide operating temperature range in the oil of an automobile engine. This range can vary from below freezing up to about 195° F. plus or minus 5%. Junction 46 of reference thermistor 40 and the temperature compensation inputs to the negative terminals 56 and 57 of comparators 58,59, respectively, are each at 2.9 volts. The voltages at junctions 50,54 and at the positive input terminals 60,62 are essentially the same, about 2.5 volts. Therefore, the output voltages from both comparators 58 and 59 will be about 0.5 volts, which is insufficient to turn transistors 68 and/or 78 on.

Voltage across resistor 80 is at a level that allows red LED 82 to illuminate because common 38 is provided to it through zener diode 81. At this time, diode 73 does not affect the illumination of red LED 82. When LED 82 is lit, it means that the oil level is at or below danger level 92, and that there is a need to add say 2 quarts of oil, depending on the size of the crank case 88.

When the oil level drops slightly below level 91, thermistor 41 will be surrounded only by a thin film of oil and will act as if surrounded by air and thermistor 42 will be immersed in oil. The voltage to positive terminal 62 of comparator 59 increases to about 3.7 volts, while the voltage to positive terminal 60 of comparator 58 remains unchanged at 2.5 volts. The voltage inputs to negative terminals 56,57 of both comparators 58 and 59 remain the same at 2.9 volts. Consequently, the output voltages from comparators 58 and 59 become unbalanced and the output voltage from comparator 59 rises by 1 volt causing transistor 78 to turn on and switch the common 38 to ground 18 through its emitter 86. Then, current starts to flow through resistor 80 which illuminates yellow LED 83, Zener diode 81 does not allow red LED 82 to light up.

When yellow LED 83 is lit, it means that the oil is at or below add-oil level 91 and that there is a need to add 1 quart of oil for the embodiment employed.

When thermistors 41 and 42 are both immersed in oil, the voltage at negative terminals 56 and 57 remains at 2.9 volts, while positive terminal 60 of comparator 58 receives 3.3 volts and the positive terminal 62 of comparator 59 receives 3.9 volts. Each output voltage from comparators 58 and 59 rises by 1 volt and transistors 68 and 78 turn on.

Diode 73 prevents LED 82 and LED 83 from illuminating, and only green LED 71 is illuminated which indicates that the oil in reservoir 70 is above normal level 90.

Releasing switch 24 causes pin 20b to return to its level of 9 volts, and allows capacitor 29 to begin to discharge through pin 20g. The values of resistor 28 and capacitor 29 are selected so that an energizing cycle by timer 19 lasts for about 2 minutes and 5 seconds. After a single cycle, timer circuit 19 automatically stops.

Whichever LED is lit will remain illuminated until timer 19 stops, at which time transistor 35 disconnects common 38 from ground 18 and network 10 is de-energized.

The components utilized in the preferred embodiment were as follows:
Resistor 22 is 10K ohms
Resistor 28 is 4M ohms
Resistor 32 is 330 ohms
Resistor 44 is 24 ohms
Resistor 48 is 22 ohms
Resistor 52 is 22 ohms
Resistor 66 and 76 are 4.7K ohms
Resistors 70 and 80 are 470 ohms
Thermistor 40 is rated at 100 ohms @23° C.
Thermistor 41 is rated at 100 ohms @23° C.
Thermistor 42 is rated at 100 ohms @23° C.
Comparator 58 is ½ of an LM193
Comparator 59 is ½ of an LM193
Transistor 35 is a TIP31A
Transistor 68 is a 2N2222
Transistor 78 is a 2N2222
Capacitor 29 is 22MFD
Capacitor 30 is 0.01MFD
Voltage regulator 16 is an AN7809
IC20 is a NE555
Diode 73 is a 1N4001
Zener diode 81 is a 1N4728

Other types of indication are possible, such as audible speech synthesizers, liquid crystal display, etc. Other variations will readily occur to those skilled in the art.

What is claimed is:

1. An electronic monitor adapted for sensing a predetermined level of a varying volume of a substance within a reservoir, said substance having a density substantially higher than the density of air, said monitor including:
    a level-sensing circuit, a reference circuit, a comparator circuit, a logic circuit, and an electric current source applying current to said circuits;
    said level-sensing circuit including at least one level-sensing thermistor positioned within the reservoir adjacent to and below said predetermined level;
    said reference circuit including a reference thermistor positioned so as to remain in the air adjacent to and above said predetermined level, said reference thermistor providing temperature compensation for said level-sensing circuit, thereby preventing erroneous level monitoring when the substance in the reservoir undergoes a large temperature change;
    each thermistor being connected in series circuit, and said series circuits being connected in parallel;
    said electric source applying current to each series circuit, whereby each thermistor becomes heated and develops a voltage thereacross which is substantially proportional to its resistance;
    each thermistor being connected to said comparator circuit which compares the voltage across the reference thermistor with the voltage across the level-sensing thermistor and provides a resultant voltage depending on the substance level within the reservoir; and
    said logic circuit uses said resultant voltage to provide an indication whether the level of the substance is at or below said predetermined level.

2. The electronic monitor of claim 1, wherein
    said level-sensing circuit includes two level-sensing thermistors that are vertically spaced apart so that both level-sensing thermistors will be immersed in the substance when the substance in the reservoir is at said predetermined level;
    each thermistor having a negative temperature coefficient, whereby the heated level-sensing thermistor when within the substance is cooler and its resistance is higher than the resistance of the heated reference thermistor in the air;
    each thermistor being connected in its series circuit with a resistor and having a junction therewith, each series circuit forming a voltage divider, and said series circuits being connected in parallel;
    each one of said junctions being connected to said comparator circuit which compares the voltage across the reference thermistor with the voltage across each level-sensing thermistor and provides resultant voltages depending on the substance level within the reservoir; and
    said logic circuit including three distinct signaling devices for monitoring said resultant voltages: one signaling device becoming activated when the substance level is about said predetermined level, the second signaling device becoming activated when the substance level is below said predetermined level, and the third signaling device becoming activated when the substance is at a level which is below a predetermined low danger level.

3. The electronic monitor of claim 2, wherein each signaling device has a distinct color.

4. An electronic monitor adapted for sensing a predetermined level of a varying volume of a substance within a reservoir, said substance having a density substantially higher than the density of air, said monitor including:
    a level-sensing circuit, a reference circuit, a comparator circuit, a logic circuit, and an electric DC current source applying current to said circuits;
    said level-sensing circuit including at least one level-sensing thermistor positioned within the reservoir adjacent to and below said predetermined level;
    said reference circuit including a reference thermistor positioned so as to remain in the air adjacent to and above said predetermined level, said reference thermistor providing temperature compensation for said level sensing circuit, thereby preventing erroneous level monitoring when the substance in the reservoir undergoes a large temperature change;

each thermistor being connected in series circuit with a resistor and having a junction therewith, each series circuit forming a voltage divider, and said series circuits being connected in parallel;

said electric source applying current to each series circuit, whereby each thermistor becomes heated and develops a voltage thereacross which is substantially proportional to its resistance;

each thermistor having a negative temperature coefficient, whereby the heated level-sensing thermistor when within the substance is cooler and its resistance is higher than the resistance of the heated reference thermistor in the air;

each one of said junctions being connected to said comparator circuit which compares the voltage across the reference thermistor with the voltage across the level-sensing thermistor and provides a difference voltage depending on the substance level within the reservoir; and said logic circuit uses said difference voltages to provide an indication whether the level of the substance is at or below said predetermined level.

5. The monitor of claim 4, wherein said substance is oil and said reservoir is an engine crank case.

6. The electronic monitor of claim 5, wherein said level-sensing circuit includes two level-sensing thermistors that are vertically spaced apart so that both level-sensing thermistors will be immersed in the oil when the oil in the crank case is at said predetermined level;

each thermistor being connected in its series circuit with a resistor and having a junction therewith, each series circuit forming a voltage divider, and said series circuits being connected in parallel;

each one of said junctions being connected to said comparator circuit which compares the voltage across the reference thermistor with the voltage across each level-sensing thermistor and provides difference voltages depending on the oil level within the reservoir; and said logic circuit including three distinct signaling devices for monitoring said difference voltages: one signaling device becoming activated when the oil level is about said predetermined level, the second signaling device becoming activated when the oil level is below said predetermined level, and the third signaling device becoming activated when the oil is at a level which is below a predetermined low danger level.

7. The electronic monitor of claim 6, wherein each comparator having a negative input terminal and a positive input terminal, said negative input terminals being connected to said reference thermistor, and said positive input terminal of one comparator being connected to one level-sensing thermistor, and said positive input terminal of said other comparator being connected to the other level-sensing thermistor.

8. The electronic monitor of claim 6, wherein each signaling device has a distinct color.

9. The electronic monitor of claim 6, and a timer circuit coupled to said electronic source, said timer circuit including a momentary push-button switch, a transistor connected between a circuit common and ground, whereby upon activating said switch, said transistor switches said common to ground and enables said electric source to energize each one of said circuits.

10. The electronic monitor of claim 9, wherein said timer having a single cycle of operation; and an R-C circuit for determining the duration of said cycle.

11. The electrical monitor of claim 6, characterized in that when the oil in said crank case is below said danger level, all said thermistors are surrounded by air, and each thermistor reaches about the same temperature, which is selected to allow for the expected wide operating temeprature range in the oil; and the output voltages from both comparators have about the same voltage value.

12. The electronic monitor of claim 1, wherein said current source supplies current to all the thermistors so that the voltages thereacross are substantially identical when all the heated thermistors are in air, and the voltage across each heated level-sensing thermistor is higher than the voltage across said reference thermistor, when the level-sensing thermistor is within the oil.

13. The electronic monitor of claim 12, characterized in that when the oil in said crank case is below said danger level, all said thermistors are surrounded by air, and each thermistor reaches about the same temperature, which is selected to allow for the expected wide operating temperature range in the oil; and the output voltages from both comparators have about the same voltage value.

* * * * *